(12) United States Patent
Modarresi et al.

(10) Patent No.: US 11,651,382 B2
(45) Date of Patent: May 16, 2023

(54) USER DATA OVERLAP DETERMINATION IN A DIGITAL MEDIUM ENVIRONMENT

(71) Applicant: Adobe Inc., San Jose, CA (US)

(72) Inventors: Kourosh Modarresi, Santa Clara, CA (US); Yi Liu, Mountain View, CA (US); Paresh P. Shenoy, Secaucus, NJ (US); Aran Nayebi, Stanford, CA (US); Pradeep Saikalyanachakravarthi Javangula, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1019 days.

(21) Appl. No.: 15/610,033

(22) Filed: May 31, 2017

(65) Prior Publication Data

US 2018/0349933 A1 Dec. 6, 2018

(51) Int. Cl.
*G06Q 30/0204* (2023.01)
*G06F 7/08* (2006.01)
*G06Q 30/0251* (2023.01)

(52) U.S. Cl.
CPC ........... *G06Q 30/0204* (2013.01); *G06F 7/08* (2013.01); *G06Q 30/0269* (2013.01)

(58) Field of Classification Search
CPC ................................................. G06Q 30/0204
See application file for complete search history.

(56) References Cited

U.S. PATENT DOCUMENTS

| | | | |
|---|---|---|---|
| 2011/0040601 A1* | 2/2011 | Bai | G06Q 30/0204 705/7.29 |
| 2011/0225173 A1* | 9/2011 | Gulhane | G06K 9/3266 707/749 |
| 2013/0238580 A1* | 9/2013 | D'Orazio Pedro De Matos | G06F 16/40 707/705 |
| 2014/0222506 A1* | 8/2014 | Frazer | G06Q 30/02 705/7.29 |

(Continued)

OTHER PUBLICATIONS

"Dealing with Massive Data—Lecture 1: Duplicate Detection", www.cs.columbia.edu/~coms699812/lecture1.pdf, Jan. 24, 2011, 3 pages.

(Continued)

*Primary Examiner* — Andre D Boyce
(74) *Attorney, Agent, or Firm* — FIG. 1 Patents

(57) ABSTRACT

User data overlap determination in a digital medium environment is described. Initially, a user selects segments of user data for which a determination of overlap is to be made. For example, the user selects a segment representing users that are working professionals and a segment representing users that are mothers, such that working-mother users may correspond to the overlap. Regardless of the particular segments selected, an indication of those segments is received. One of multiple different overlap determining techniques—which can include a combined MinHash and HyperLogLog (HLL) technique and an Inclusion-Exclusion technique—may be selected for computing the overlap based on a number of segments indicated and numbers of (Continued)

users represented by the segments. The selected overlap determining technique is then used to compute the user data overlap between the indicated segments. Digital content including values indicative of the determined overlap is generated for presentation to a user.

20 Claims, 8 Drawing Sheets

(56) References Cited

U.S. PATENT DOCUMENTS

| | | | | |
|---|---|---|---|---|
| 2016/0179894 A1* | 6/2016 | Gupta | ................ | G06F 16/2456 707/714 |
| 2017/0178256 A1* | 6/2017 | Albert | .............. | G06Q 10/06375 |
| 2018/0365715 A1* | 12/2018 | Malhotra | ............... | G06N 5/043 |

OTHER PUBLICATIONS

Broder,"On the resemblance and containment of documents", Compression and Complexity of Sequences: Proceedings. Positano, Amalfitan Coast, Salerno, Italy, Jun. 1997, 9 pages.

Evseenko,"Python Implementation of Super and Hyper Log Log Sketches", GitHub Repository—https://github.com/svpcom/hyperloglog—Retrieved on Feb. 28, 2017, 2016, 2 pages.

Flajolet,"HyperLogLog: the analysis of a near-optimal cardinality estimation algorithm", AGFA '07: Proceedings of the 2007 International Conference on the Analysis of Algorithms, May 2007, pp. 127-146.

McCormick,"Example Python code for comparing documents using MinHash", GitHub Repository. https://github.com/chrisjmccormick/MinHash—Retrieved on Feb. 28, 2017, 2015, 1 page.

Ting,"Towards Optimal Cardinality Estimation of Unions and Intersections with Sketches", KDD 2016. http://www.kdd.org/kdd2016/papers/files/rfp0467-tingA.pdf—Retrieved on Feb. 28, 2017, Aug. 2016, 10 pages.

Zhu,"Probabilistic data structures for processing very large datasets", Github Repository https://github.com/ekzhu/datasketch—Retrieved on Feb. 28, 2017, 2016, 10 pages.

* cited by examiner

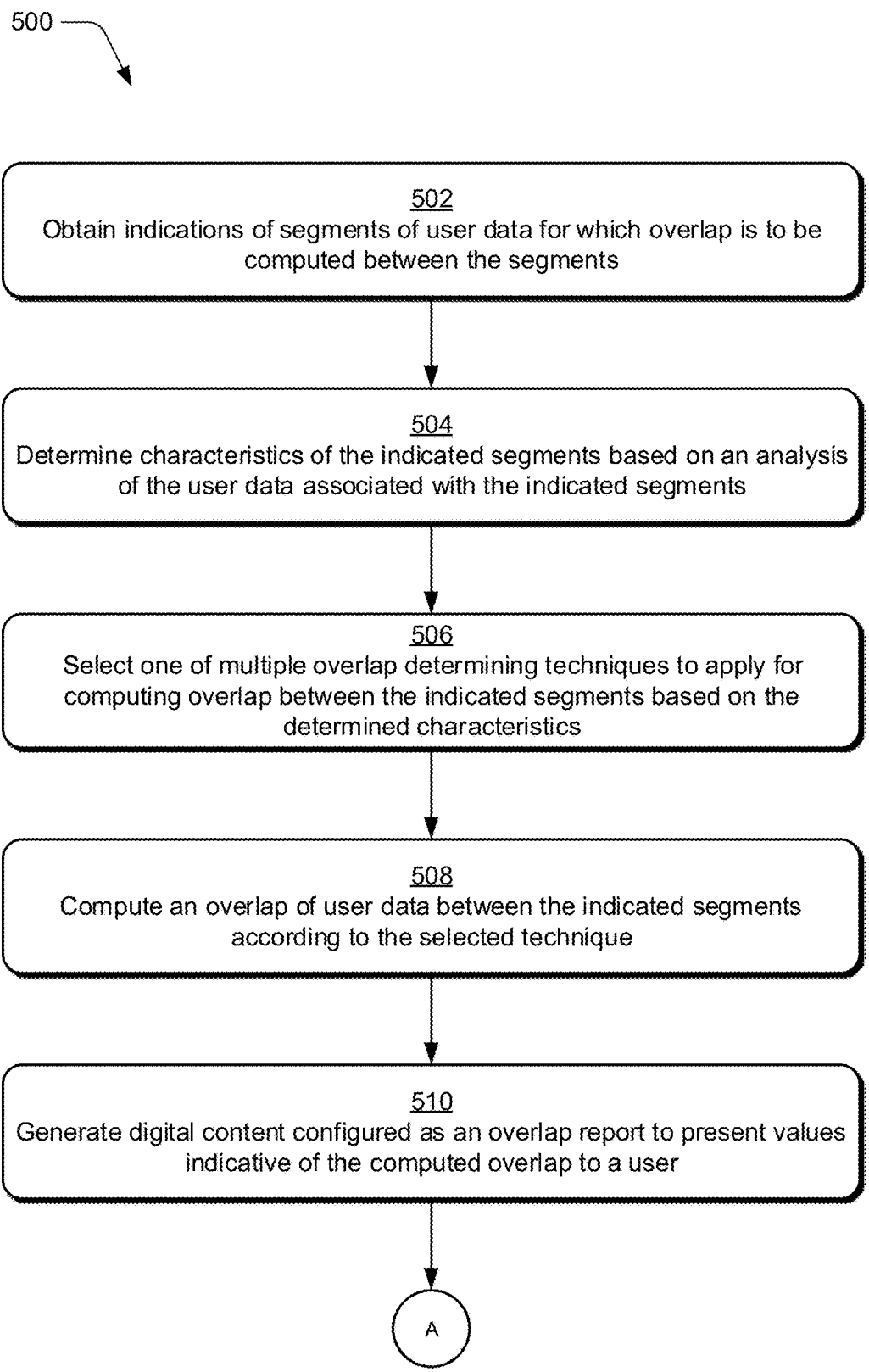

USER DATA OVERLAP DETERMINATION IN A DIGITAL MEDIUM ENVIRONMENT

BACKGROUND

Many businesses deliver targeted digital content to consumers to attempt to persuade them to purchase the products or services those businesses provide or engage the consumers with a desired experience, such as clicking on a link. By way of example, businesses deliver digital content configured as banners integrated into advertising portions of a web page, video clips integrated into these and other portions of web pages, emails, and so on. This digital content is "targeted" insofar as it is configured differently depending on a user to which the digital content is delivered. The digital content delivered to one user (or a first group of users) can be configured to include different portions of content (e.g., different images, different text, different colors, and so on) than the digital content delivered to another user (or a different group of users). This allows businesses to attempt to persuade different groups of users (such as teenage boys and working, professional mothers) using different messaging-through different configurations of content. Additionally, targeting segments containing similar users is less expensive and may be often more desirable-versus targeting individual users.

In general, these different groups of users are referred to as "segments." Businesses may select to deliver targeted digital content to a variety of different segments and configure targeted digital content differently for different segments. Regardless, segment selection may be leveraged in connection with delivering targeted digital content. Selecting segments so as to persuade as many users as possible (or some target number of users) to purchase the products or services corresponding to the targeted digital content can be difficult, however. Additionally, businesses may try to avoid delivering targeted content to a particular user multiple times. This is because users may become annoyed with businesses that repeatedly deliver content for the same products or services, and because each delivery of targeted content may cost some amount of money. To this extent, delivering targeted content to some users more than once may cost businesses money that the businesses prefer to use in other ways, e.g., delivering the content to users that have not yet received the digital content. Accordingly, segmentation techniques can involve determining overlap between segments of users, e.g., determining whether a user represented by one segment is also represented by another segment.

Consider an example in which one segment corresponds to mothers and another segment corresponds to working professionals. In this example, there may be significant overlap between these two segments, e.g., users that are working mothers. In order to avoid delivering targeted content multiple times to these working mothers, the overlap between the mothers and the working professionals may be determined. Some techniques for determining the overlap between user segments can be relatively slow but accurate in many different scenarios, while other techniques can be faster than such slow-and-accurate techniques, but accurate in limited scenarios.

By way of example, consider a case in which a first user segment includes 1,000,000 users, a second user segment includes 1,200,000 users, a third segment includes 4,000,000 users, and a fourth segment includes 5,000,000 users. In this example, a slow-and-accurate technique can be used to compute the overlap when a user selects to have overlap computed between all four of the segments and for each of the different 3-segment combinations, e.g., a first-second-and-third segment combination, a first-second-and-fourth segment combination, a second-third-and-fourth segment combination, and so on. The slow-and-accurate technique may also be capable of accurately computing the overlap when a user selects two segments having a significant difference in numbers of users (e.g., the first and fourth segments) as well as when a user selects two segments having similar numbers of users but that are dissimilar, e.g., teenage males from California and female senior citizens from Iowa. Though the slow-and-accurate technique may be usable to accurately compute overlap in a variety of different scenarios, it may take a several hours to do so.

In contrast, the fast-and-accurate-in-limited-scenarios technique may not be useable to compute overlap when a user selects to have overlap computed between all four of the segments or for any of the different 3-segment combinations. Instead, the fast-and-accurate-in-limited-scenarios technique may only be usable to compute overlap in connection with selections involving two segments. In two-segment scenarios, the fast-and-accurate-in-limited-scenarios technique may be leveraged to compute the overlap much faster than the slow-and-accurate technique, e.g., in minutes rather than several hours. Even in some of these 2-segment scenarios, however, the fast-and-accurate-in-limited-scenarios technique may not accurately compute overlap, such as when there is a significant difference in the number of users of the selected segments and when the segments are dissimilar. Instead, the fast-and-accurate-in-limited-scenarios technique may be limited to accurately computing overlap for 2-segment cases where the segments have a similar number of users and the users are similar according to a similarity measure. The drawbacks of these different techniques may hamper the ability to efficiently deliver targeted digital content in a most cost-effective manner.

SUMMARY

To overcome these problems, user data overlap is determined in a digital medium environment. Initially, a user selects segments of user data for which a determination of overlap is to be made. By way of example, the user selects a segment representing users that are working professionals and another segment representing users that are mothers, such that working-mother users may correspond to the overlap of the segments. Regardless of the particular segments selected, an indication of those segments is received. One of multiple different overlap determining techniques may be selected for computing the overlap based on a number of segments indicated and numbers of users represented by each of the segments. In one or more implementations, the different overlap determining techniques include a combined MinHash and HyperLogLog (HLL) technique and an Inclusion-Exclusion technique. The selected overlap determining technique is then used to compute the user data overlap between the indicated segments. Digital content including values indicative of the determined overlap is generated for presentation to a user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIGS. 5A and 5B depict a procedure in an example implementation in which overlap is determined for the user data of multiple segments by selecting between two different techniques for determining user data overlap.

DETAILED DESCRIPTION

Overview

Figure 1:
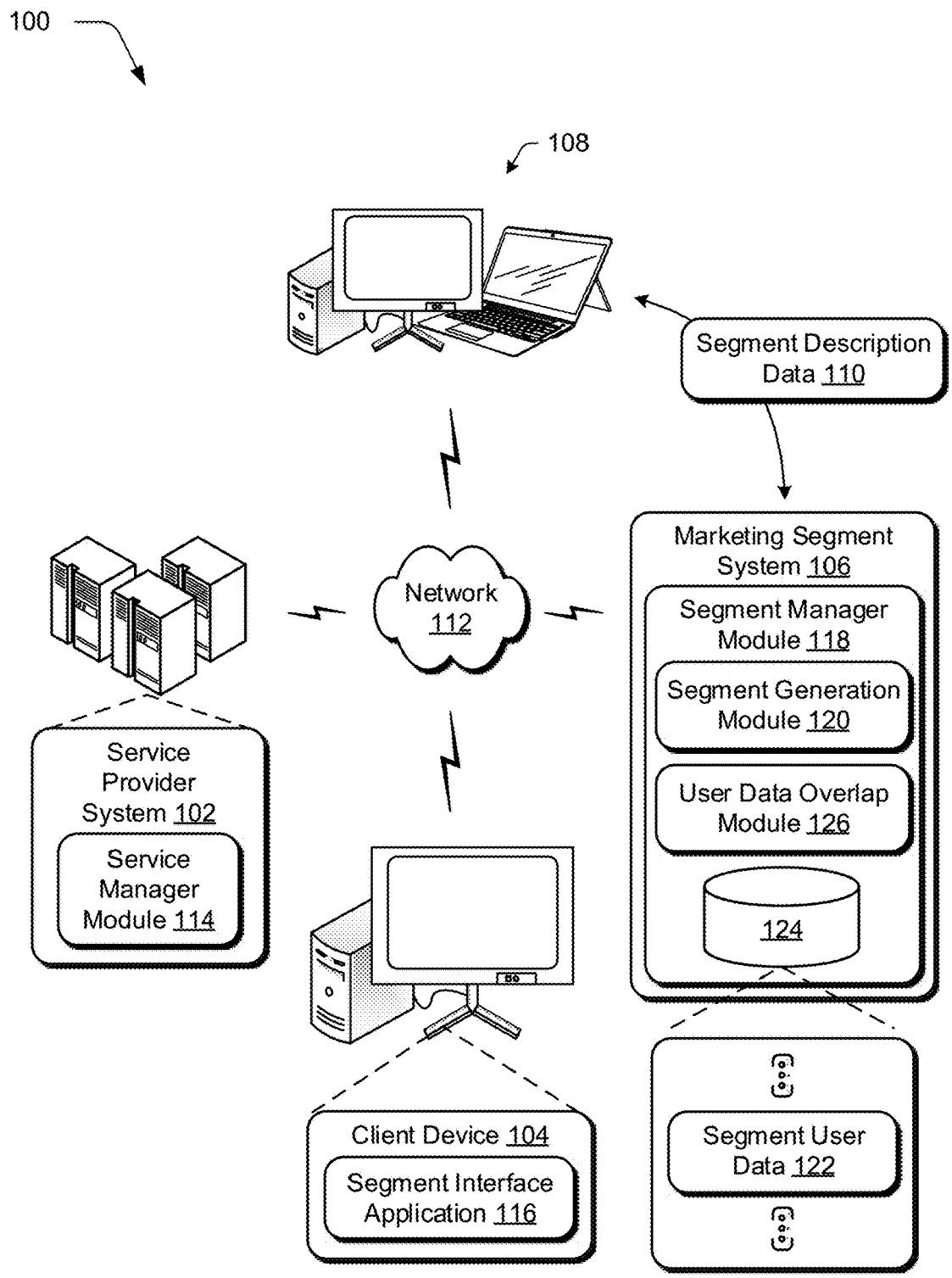
FIG. 1 is an illustration of an environment in an example implementation that is operable to employ techniques described herein.

Many businesses deliver targeted digital content to consumers to attempt to persuade them to engage in a desired experience or interaction, such as to purchase the products or services those businesses provide. Businesses may select to deliver targeted digital content to a variety of different groups of users, referred to as "segments." The targeted digital content can also be configured differently for different segments. Nevertheless, selecting segments so as to persuade as many users as possible (or some target number of users) to purchase the products or services corresponding to the targeted digital content can be difficult. Additionally, businesses may try to avoid delivering targeted content to a particular user multiple times. This is because users may become annoyed with businesses that repeatedly deliver content for the same products or services, and because each delivery of targeted content may cost some amount of money.

Accordingly, segmentation techniques can involve determining overlap between segments of users, e.g., determining whether a user represented by one segment is also represented by another segment. Some techniques for determining the overlap between user segments are accurate in many different scenarios but relatively slow, while other techniques can be faster than such slow- and accurate techniques, but accurate in limited scenarios. By way of example, consider a case in which a first user segment includes 1,000,000 users, a second user segment includes 1,200,000 users, a third segment includes 4,000,000 users, and a fourth segment includes 5,000,000 users. In this example, the slow-and-accurate technique can be used to compute the overlap when a user selects to have overlap computed between all four of the segments and for each different 3-segment combination, e.g., the first-second-and-third segment combination, the first-second-and-fourth segment combination, the second-third-and-fourth segment combination, and so on. The slow-and-accurate technique can also be used to compute the overlap when a user selects two segments. Though usable to accurately compute overlap in a variety of scenarios, doing so may take several hours with the slow-and-accurate technique.

In contrast, the fast-and-accurate-in-limited-scenarios technique may not be useable to compute overlap for a selection of all four of the segments or any of the different 3-segment combinations. Instead, the fast-and-accurate-in-limited-scenarios technique may only be usable to compute overlap in connection with 2-segment selections. In such scenarios, the fast-and-accurate-in-limited-scenarios technique may be leveraged to compute overlap much faster than the slow-and-accurate technique, e.g., in minutes rather than several hours. Even in some of these 2-segment scenarios, however, the fast-and-accurate-in-limited-scenarios technique may not accurately compute overlap, such as when there is a significant difference in number of users of the selected segments and when the segments are dissimilar. Instead, the fast-and-accurate-in-limited-scenarios technique may only be capable of accurately computing overlap for 2-segment cases where the segments have a similar number of users and the segments are similar according to a similarity measure. The drawbacks of these different techniques may hamper the ability to efficiently deliver targeted digital content in a most cost-effective manner.

To overcome these problems, user data overlap is determined in a digital medium environment. In one or more implementations, a user is presented a segment-selection interface, which allows the user to select segments of user data for which a determination of overlap is to be made. The segment-selection interface allows the user to select two or more segments for an overlap determination. By way of example, the segment-selection interface allows the user to select segments such as a segment representative of users that are mothers and a segment representative of users that are working professionals. In this scenario, the overlap may correspond to users that are working mothers—and may be determined as described below.

Regardless of the particular segments selected, the segments identified through the selection may be analyzed to select one of multiple techniques for determining overlap. This analysis involves determining a number of segments selected and, for each of the segments, a number of distinct users in the segment. Depending on an initial analysis, further analysis may be performed as described below. Based on the analysis, one of the overlap determining techniques is selected for a determination of user data overlap between the selected segments.

In one or more implementations, there are two overlap determining techniques, e.g., a combined MinHash and HyperLogLog (HLL) technique and an Inclusion-Exclusion technique. In such implementations, one of the combined MinHash and HLL technique or the Inclusion-Exclusion technique is thus selected to determine the overlap. By way of example, the combined MinHash and HLL technique may be selected responsive to determining that more than two segments have been selected. The combined MinHash and HLL technique may also be selected responsive to determining that only two segments have been selected but the number of users in a first of the segments is substantially different than the number of users in a second of the segments. The Inclusion-Exclusion technique may be selected in other scenarios as described in more detail below.

Accordingly, the multiple overlap determining techniques include a first and second overlap determining techniques. Broadly speaking, the first overlap determining technique may accurately determine overlap for a wide variety of segment overlap determinations but do so relatively slowly, e.g., the combination of MinHash and HLL. In contrast, the second overlap determining technique (e.g., the Inclusion-Exclusion technique) may accurately determine overlap for limited overlap-determination scenarios, such as scenarios involving only two segments, where the segments have a similar number of users, and so on. Although accurate with limited scenarios, the second overlap determining technique may be relatively faster, e.g., on the scale of minutes versus hours. By utilizing two such overlap determining techniques in different scenarios, user data overlap determinations may be made faster than conventional techniques while still being accurate.

Once determined, values indicative of the overlap can be incorporated into an overlap report that is presented to a user. By way of example, an overlap reporting interface can be generated that includes a number of users that, individually, are in each of the selected segments. Referring again to the example with the mothers' segment, working-professionals segment, and the working-mothers overlap, the overlap reporting interface can be generated to include the number of users that are the working mothers. Additionally or alternately, the overlap reporting interface can include a percentage of overlap between the selected segments. In any case, indications of the overlap can be presented to users in a variety of different ways, such as displayed, output via speakers, and so forth. It should be appreciated that a variety of different information pertinent to the determined overlap may be presented without departing from the spirit or scope of the techniques described herein.

Computing overlap between segments faster than conventional techniques while still maintaining a tolerable level of accuracy—as determined by a user-adjustable efficiency tolerance threshold—allows users (e.g., marketers) to more efficiently create non-overlapping segments and select segments for delivery of targeted digital content. Avoiding redundant content delivery may prevent users from getting annoyed with a business (and more likely to purchase their products or services) and enable businesses' to be more efficient with their resources.

Term Descriptions

As used herein, the term "segment" refers to a group of users that are defined to have different attributes than other groups of users. Examples of segments can include a teenage boy segment and a working, professional mother segment—though segments can be defined on a more granular level. Businesses may select to deliver targeted digital content to a variety of different segments and configure targeted digital content differently for different segments. It should be appreciated that segments may be defined that have varying numbers and types of attributes without departing from the spirit or scope of the techniques described herein.

As used herein, the term "targeted digital content" refers to digital content that is adjusted to have different portions of content or characteristics (e.g., different images, different text, different colors, and so on) depending on a user segment to which it is delivered. By way of example, and not limitation, targeted digital content can include banners integrated into advertising portions of web pages, social media posts, video clips integrated into web pages, emails, and so on.

As used herein, "MinHash" refers to a technique configured to estimate a Jaccard similarity between two sets. The "Jaccard similarity" of two sets, set A and set B, is the ratio of the intersection (∩) of sets A and B to the union (∪) of sets A and B.

As used herein, "HyperLogLog" or "HLL" refers to a probabilistic cardinality estimator that approximates the number of distinct elements (e.g., users) in a multiset, and is configured to do so using significantly less memory than techniques for computing exact cardinality of the multiset. HLL is based on the observation that cardinality of a multiset of uniformly distributed random numbers can be estimated by calculating the maximum number of leading zeroes in the binary representation of each number in the set.

The term "Inclusion-Exclusion technique" refers to a counting technique, which generalizes the method of obtaining a number of intersecting elements in two finite sets, e.g., segments A and B.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ user data overlap determination as described herein. The illustrated environment 100 includes a service provider system 102, client device 104, marketing segment system 106, and sources 108 of segment description data 110 that are communicatively coupled, one to another, via a network 112.

Computing devices that are usable to implement the service provider system 102, client device 104, marketing segment system 106, and sources 108 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 102 is illustrated as including a service manager module 114 that is representative of functionality to provide services accessible via the network 112 that are usable to make products or services available to consumers. The service manager module 114, for instance, may expose content or functionality that is accessible via the network 112 by a segment interface application 116 of the client device 104. The segment interface application 116 may be configured in a variety of ways, e.g., it may be configured as a browser-based application, a native application capable of leveraging exposed segment information, a network-enabled application, and so on that obtains data from the service provider system 102 via the network 112. This data can be employed by the segment interface application 116 to enable a user of the client device 104 to perform a variety of actions in connection with the service provider system 102, such as to leverage information about segments of users (e.g., create segments based on the information, select already-created segments, obtain information about segments, and so on) when the service provider system 102 provides user-segment-based resources.

To enable users (e.g., marketers) to leverage segment-based resources for promoting products or services, the service provider system 102 may employ a marketing segment system 106. Although functionality of the marketing segment system 106 is illustrated as separate from the service provider system 102, this functionality may also be incorporated as part of the service provider system 102, further divided among other entities, and so forth. The marketing segment system 106 includes a segment manager module 118 that is implemented at least partially in hardware of a computing device to provide users with a variety of different tools for defining segments of users, utilizing already defined segments, and obtaining information about segments. In accordance with one or more implementations, the user of the client device 104 may access such tools via the segment interface application 116. In general, these segment-based resources enable users to effectively provide targeted digital content for consumption by consumer-users in an attempt to cause conversion of products or services.

In general, the segment description data 110 represents selections or assertions made by the sources 108 to define segments of users. By way of example, a user of one of the sources 108 may select one or more desired attributes for defining a segment of users, e.g., the user of a source may provide selections to create a segment of users that are female (a selected gender attribute), between 26 and 35 years old (a selected age attribute), reside in Washington state (a selected residence attribute), and have a demonstrated interest in travel (a selected interests attribute). The users may make selections or assertions in a variety of different ways to define segments of users without departing from the spirit or scope of the techniques described herein, such as by selecting selectable attributes via user interface components, typing in expressions that are effective to assert the attributes users of a segment are to have, and so forth. Based on the segment description data 110, the segment manager module 118's segment generation module 120 is configured to generate and maintain segment user data 122, which is illustrated as stored in storage 124.

The segment user data 122 is indicative of users that are included in defined segments. For instance, the segment user data 122 for a particular segment may be configured as a list of user data (e.g., a list of user identifiers) indicative of the users that are included in the particular segment. The segment user data 122 may thus represent many lists for defining numerous different user segments according to the segment description data 110. This segment user data 122 may also be updated dynamically as the characteristics of users change, such that a user that was not previously part of a segment may be added to the segment when an attribute for the user changes to a value corresponding to the segment. For instance, responsive to a user turning 25 years old, the user may be added to segments that include 25 year olds. Users may be removed from segments in a similar manner, e.g., when the users no longer have the characteristics that correspond to a segment. The segment user data 122 is updated to reflect such additions and removals.

In any case, the segment user data 122 includes information that is sufficient to enable a user (e.g., a marketer) to select or create a segment of users and deliver targeted digital content to the users of the segment. The segment user data 122 can also be analyzed to ascertain information about the segments. By way of example and not limitation, the segment manager module 118 can analyze the segment user data 122 to ascertain a number of users in a segment, characteristics of users in a segment (e.g., a residence associated with the users of a segment), a number of users in a segment having a characteristic (e.g., a number of users for which a residence attribute indicates a particular location), an amount of overlap between segments, and so forth.

The segment manager module 118 is also illustrated with user data overlap module 126, which indicates functionality to determine overlap between user segments. To determine an amount of overlap between multiple segments, the user data overlap module 126 is configured to select from a plurality of different overlap determining techniques. With two segments, for instance, the amount of overlap may indicate a number or percentage of users that are included in both segments. Consider again the above-described overlap example in which one segment is defined as mothers, another segment is defined as working professionals, and overlap corresponding to working mothers is determined. With three segments, though, the amount of overlap may indicate a number or percentage of users that are included in each of the three segments.

The plurality of different overlap determining techniques from which the user data overlap module 126 is configured to select includes at least a first and second overlap determining technique. In accordance with one or more implementations, the first overlap determining technique may accurately determine overlap for a wide variety of segment comparisons but do so relatively slowly (e.g., a combined MinHash and HyperLogLog (HLL) technique). The first overlap determining technique may be referred to herein as a "robust-accuracy-but-slow" technique. In contrast, the second overlap determining technique may accurately determine overlap for limited segment comparisons, e.g., comparisons between only two segments, where the segments have a similar number of users, and so on. Although accurate with limited scenarios, the second overlap determining technique may be relatively faster. Accordingly, the second overlap determining technique may be referred to herein as a "limited-accuracy-but-fast" technique. In accordance with one or more implementations, the limited-accuracy-but-fast technique may correspond to the Inclusion-Exclusion technique.

To select between the robust-accuracy-but-slow technique and the limited-accuracy-but-fast technique, the user data overlap module 126 is configured to analyze the segment user data 122. In particular, the user data overlap module 126 analyzes the segment user data 122 that corresponds to the segments being compared. The user data overlap module 126 then selects the technique according to the analysis. As part of the analysis, the user data overlap module 126 determines a number of segments for which the overlap is being computed and a size of each of the segments. The user data overlap module 126 can also compute a similarity measure between the segments as part of the analysis. The user data overlap module 126 can then select the overlap determining technique to use based on the number of segments, the number of users in each segment, and/or the similarity measure. The user data overlap module 126 also selects the overlap determining technique based on an efficiency tolerance threshold that is configured to balance accuracy and speed of the overlap determination.

By utilizing the robust-accuracy-but-slow technique and the limited-accuracy-but-fast technique in different scenarios, the user data overlap module 126 generally determines overlap faster than conventional techniques while still accurately making the determination. This allows users (e.g., marketers) to more efficiently create generally non-overlapping segments of users and select segments for delivery of targeted digital content so that the targeted content is not delivered multiple times to individual users. Avoiding redundant content delivery may prevent users from getting annoyed with a business (and more likely to purchase their products or services) and enable businesses' to be more efficient with their resources.

Having considered an example environment, consider now a discussion of some example details of the techniques for user data overlap determination in a digital medium environment in accordance with one or more implementations.

User Data Overlap Determination

Figure 2:
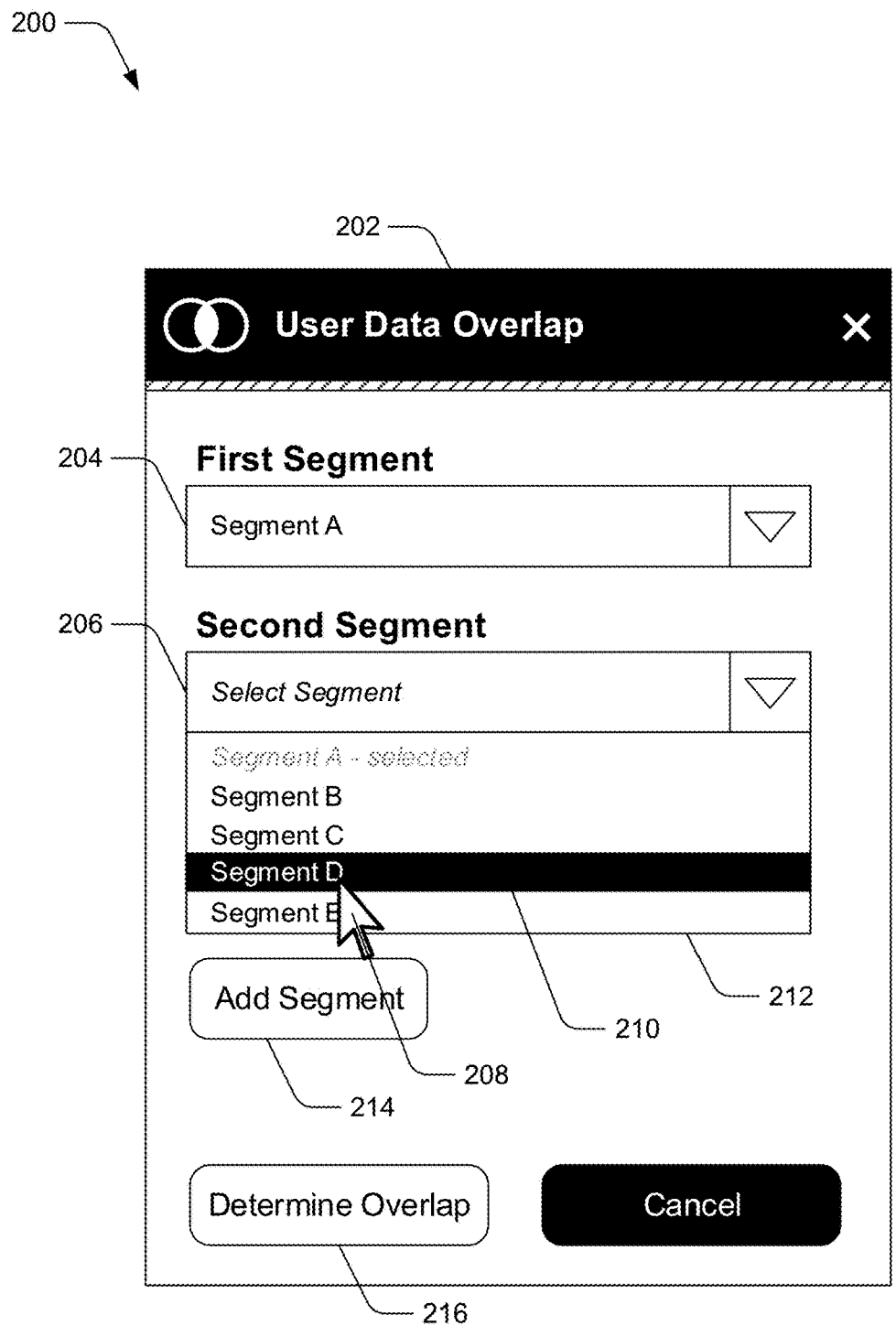
FIG. 2 depicts an example user interface configured to present selectable segments for a determination of user data overlap.

FIG. 2 depicts an example user interface 200 that is configured to present selectable segments for a determination of user overlap data. The illustrated example 200 includes segment-selection interface 202, which is depicted as a displayable dialog box, though other configurations are contemplated in the spirit or scope of the techniques described herein.

The segment-selection interface 202 may be generated based on the segment user data 122 and presented responsive to a menu selection in the segment interface application 116. User selections made via the segment-selection interface 202 may initiate a determination of user data overlap, e.g., for the segment user data 122 of selected user segments.

In general, the segment-selection interface 202 allows a user of the client device 104 to select user segments for an overlap determination. The segment-selection interface 202 includes first and second segment selection components 204, 206. The first segment selection component 204 can be manipulated by a user to select a first segment represented by the segment user data 122. In the illustrated example 200, it is depicted that a user has selected 'Segment A' using the first segment selection component 204. The second segment selection component 206 can be manipulated by a user to select a second segment represented by the segment user data 122. The illustrated example 200 depicts that a user is making a selection of a segment using the second segment selection component 206. In particular, cursor 208 and highlight 210 indicate a potential selection of 'Segment D' from selectable segment list 212. As 'Segment A' has already been selected, it is unavailable for selection from the selectable segment list 212. Accordingly, 'Segment A' is illustrated as being grayed out and with the indication 'selected'. These visual characteristics indicate that 'Segment A' is not again selectable for the overlap determination.

In accordance with the described techniques, only two segments need to be selected for a determination of user data overlap. Nonetheless, overlap may be determined between more segments. The segment-selection interface 202 thus also includes add segment button 214, which represents functionality to add more segments for a determination of user data overlap. By way of example, a user may select the add segment button 214, which causes the segment-selection interface 202 to be updated to display a third segment selection component. From this third segment selection component, the user can select a third segment for a user data overlap determination, which is different from the first and second segments. The add segment button 214 may allow a user to add any number of different segments for a determination of user data overlap.

The segment-selection interface 202 also includes determine overlap button 216, which represents functionality to initiate an overlap determination for segments a user has selected via the segment-selection interface 202. In particular, selection of the determine overlap button 216 may generate an indication of the selected user segments and cause the indication to be provided to the user data overlap module 126. This enables the user data overlap module 126 to determine overlap between the selected segments. Although FIG. 2 illustrates the segment-selection interface 202, the segment interface application 116 may allow a user to identify two or more segments for an overlap determination and initiate the determination in a variety of different ways than illustrated without departing from the spirit or scope of the techniques described herein. Regardless of how the segments are identified for an overlap determination, an indication of the identified segments is provided for determining overlap between them. In this context, consider FIG. 3.

Figure 3:
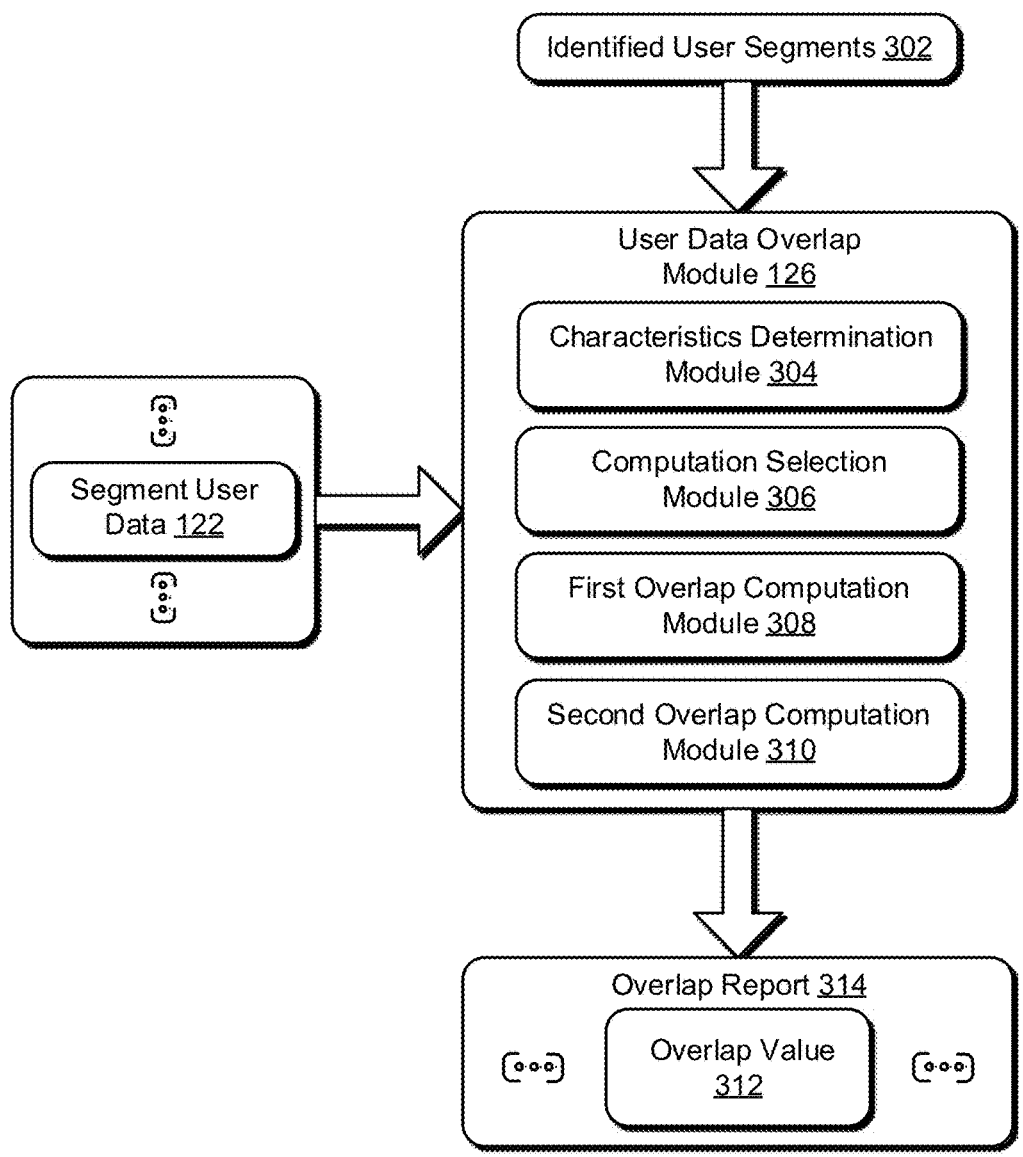
FIG. 3 depicts an example implementation in which a marketing segment system of FIG. 1 determines overlap between the user data of multiple identified user segments and configures digital content to report the determined overlap.

FIG. 3 depicts an example implementation 300 in which a marketing segment system of FIG. 1 determines overlap between the user data of multiple selected user segments and configures digital content to report the determined overlap. The illustrated example 300 includes from FIG. 1 the user data overlap module 126 and the segment user data 122.

The user data overlap module 126 is depicted obtaining identified user segments 302 as input. The identified user segments 302 may correspond to data generated as a result of segment selections made by a user at the client device 104 via the segment interface application 116, e.g., via the segment-selection interface 202. In any case, the identified user segments 302 indicate the user data for which a determination of overlap is to be made. In other words, the identified user segments 302 correspond to a request to compute overlap between the segments identified by the identified user segments 302. In general, an overlap determination determines users that are in each of the identified user segments. When there are two segments, for instance, an overlap determines the users that are in both segments. When there are three segments, an overlap determination may determine the users that are in each of the three segments. Regardless, not only is the user data overlap module 126 configured to determine overlap between the identified user segments 302, but the user data overlap module 126 is also configured to generate digital content for reporting the overlap, e.g., to report a number of overlapping users, a percentage of overlap between segments, and so forth.

The user data overlap module 126 is illustrated with characteristics determination module 304, computation selection module 306, first overlap computation module 308, and second overlap computation module 310. The characteristics determination module 304 represents functionality to determine characteristics of the identified user segments 302, such as a number of user segments identified, numbers of users in each of the segments, measures of similarity between segments, and so forth. The computation selection module 306 represents functionality to select between a first overlap computation technique (e.g., robust-accuracy-but-slow technique) and a second overlap computation technique (e.g., limited-accuracy-but-fast technique) based on the characteristics determined by the characteristics determination module 304. Determination of these characteristics may involve an analysis of the segment user data 122 that corresponds to the identified user segments 302. The first and second overlap computation modules 308, 310 represent functionality to compute overlap between the identified user segments 302 as described in more detail below. In general, though, the first overlap computation module 308 represents functionality to compute overlap between the identified user segments 302 according to a first overlap computation technique (e.g., robust-accuracy-but-slow technique)—when the first overlap computation technique is selected by the computation selection module 306. Similarly, the second overlap computation module 310 represents functionality to compute overlap between the identified user segments 302 according to a second overlap computation technique (e.g., limited-accuracy-but-fast technique)—when the second overlap computation technique is instead selected by the computation selection module 306.

Given this, the characteristics determination module 304 may analyze the segment user data 122 to determine characteristics of the identified user segments 302. This analysis involves determining a number of segments to be compared, e.g., according to the segments indicated in the identified user segments 302. The characteristics determination module 304 also analyzes the segment user data 122 to ascertain a number of users in each of the identified user segments 302. Based on one or both of the determined number of segments to be compared and the determined number of users in each segment, the computation selection module 306 may simply select the first overlap computation technique for computing the overlap. Alternately, the characteristics determination module 304 may be further leveraged to analyze the segment user data 122 based on the number of segments to be compared and the number of users in each segment. In connection with this further analysis, the characteristics determination module 304 may compute a measure of similarity between the identified user segments 302. In scenarios where the similarity measure is computed, the computation selection module 306 may select between the first and second overlap computation techniques based on the determined number of segments, the number of users in each segment, and the computed similarity measure, as determined by the characteristics determination module 304.

In one or more implementations, the first overlap computation technique—the robust-accuracy-but-slow technique—corresponds to a combination of MinHash and HyperLogLog (HLL). A discussion of this combined technique, and how the first overlap computation module 308 may compute overlap using it, is described in more detail below. In one or more implementations, the second overlap computation technique—the limited-accuracy-but-fast technique—corresponds to a technique referred to as Inclusion-Exclusion. A discussion of Inclusion-Exclusion, and how the second overlap computation module 310 may compute overlap using it, is described in more detail below, after discussion of the combined MinHash and HLL technique.

In general, MinHash is a technique configured to estimate a Jaccard similarity between two sets. The Jaccard similarity of two sets, set A and set B, is the ratio of the intersection (∩) of sets A and B to the union (∪) of sets A and B. By way of example, Jaccard similarity, J( ), may be computed according to the following:

$$J(A, B) = \frac{|A \cap B|}{|A \cup B|}$$

When the sets are disjoint (there are no overlapping users in sets A and B), the value is 0. When the sets are equal, the value is 1. Otherwise, the computed value falls strictly between 0 and 1, where sets are more similar when the Jaccard index is closer to 1 and less similar when the Jaccard index is closer to 0. In accordance with one or more implementations, the characteristics determination module 304 computes the union of sets A and B, |A∪B|, using HLL.

In general, HLL is a probabilistic cardinality estimator that approximates the number of distinct elements (e.g., users) in a multiset, and is configured to do so using significantly less memory than techniques for computing exact cardinality of the multiset. HLL is based on the observation that cardinality of a multiset of uniformly distributed random numbers can be estimated by calculating the maximum number of leading zeros in the binary representation of each number in the set. In connection with HLL, the characteristics determination module 304 may be configured to apply a hash function to each element of the segments under consideration to obtain a multiset of uniformly distributed random numbers with the same cardinality as the original segments. The cardinality of this distributed set is then estimated and is used as the cardinality of the segments.

When employed to compute overlap using the combined MinHash and HLL technique, the first overlap computation module 308 may do so according to the following. Initially, the first overlap computation module 308 computes a number of random hash functions. In one or more implementations, the first overlap computation module 308 computes at least 22,000 random hash functions. The exact number of random hash functions computed by the first overlap computation module 308 may be represented by k. Given this, the overlap computation module 308 computes k random hash functions $g_1, \ldots, g_k$. For the purposes of discussion, it is assumed that the first overlap computation module 308 computes the overlap for two segments, segment A and segment B. Nevertheless, the first overlap computation module 308 is also configured to compute overlap using the combined technique for more than two segments without departing from the spirit or scope of the techniques described herein.

Using the random hash functions $g_1, \ldots, g_k$, the first overlap computation module 308 computes summary vectors for the segments A and B. By way of example, the first overlap computation module 308 computes the summary vectors according to the following:

$$S(A) = \langle H_1(A), \ldots, H_k(A) \rangle$$

$$S(B) = \langle H_1(B), \ldots, H_k(B) \rangle$$

Here, the term S(A) represents the summary vectors computed for segment A, the term $H_1(A)$ represents application of the first hash function to the segment A, and the term $H_k(A)$ represent application of the $k^{th}$ hash function to the segment A. Similarly, the term S(B) represents the summary vectors computed for segment B, the term $H_1(B)$ represents application of the first hash function to the segment B, and the term $H_k(B)$ represent application of the $k^{th}$ hash function to the segment B.

In particular, the term $H_i(W)$ represents a minimum value of the hash function $g_i$ as applied to any segment W. By way of example, the first overlap computation module 308 computes the minimum value of the hash function $g_i$ applied to segment W as follows:

$$H_i(W) = \min_{w \in W} g_i(w)$$

Given the summary vectors for the segments A and B, the first overlap computation module 308 determines a number of indices of the summary vectors S(A) and S(B) that match. In one or more implementations, the first overlap computation module 308 may determine the number of matching indices Y according to the following:

$$Y = \Sigma_{i=1}^{k} Y_i$$

Here, the first overlap computation module 308 is configured to set $Y_i=1$ if $H_i(A)$ matches $H_i(B)$ (e.g., $H_i(A)=H_i(B)$), and to set $Y_i=0$ otherwise. Once the number of matching indices Y is determined, the first overlap computation module 308 can compute a Jaccard-similarity estimate by dividing the number of matching indices Y by the number of computed random hashing functions k, as follows:

$$\frac{Y}{k}$$

From this, the first overlap computation module 308 determines the overlapping user data between segments A and B. By way of example, the first overlap computation module 308 determines a number of overlapping users in segments A and B, $|A \cap B|$, by multiplying the estimated Jaccard similarity by the union of segments A and B, $|A \cup B|$, which the characteristics determination module 304 is configured to compute using HLL as discussed above. The first overlap computation module 308 may compute the number of overlapping users $|A \cap B|$ in this way based on the following identity:

$$|A \cap B| = \frac{|A \cap B|}{|A \cup B|} * |A \cup B|$$

Turning to the discussion of the Inclusion-Exclusion technique, in accordance with one or more implementations. In general, the Inclusion-Exclusion technique is a counting technique, which generalizes the method of obtaining a number of intersecting elements in two finite sets, e.g., segments A and B. When employed to compute overlap between segments A and B using the Inclusion-Exclusion technique, the second overlap computation module 310 may do so according to the following:

$$|A \cap B|=|A|+|B|-|A \cup B|$$

The second overlap computation module 310 computes a number of overlapping users in segments A and B $|A \cap B|$, in part, using the union of segments A and B, $|A \cup B|$, which the characteristics determination module 304 is configured to compute using HLL as discussed above.

With regard to selecting between first and second overlap computation techniques, consider the following example. In implementations where the combined MinHash and HLL technique (combined technique) or the Inclusion-Exclusion technique are used, the computation selection module 306 may select the combined technique when overlap is to be determined for three or more segments. Accordingly, the Inclusion-Exclusion technique simply may not be used when there are three or more identified user segments 302. In scenarios where there are three or more identified user segments 302, the computation selection module 306 may select the first overlap computation technique and thus employ the first overlap computation module 308 to compute the overlap. By way of example, the first overlap computation module 308 may be configured to compute the overlap of three or more user segments using the combined technique according to the following:

$$\left| \bigcap_{i=1}^{N} A_i \right| = \frac{\left\lceil \bigcap_{i=1}^{N} A_i \right\rceil}{\left\lceil \bigcup_{i=1}^{N} A_i \right\rceil} * \left| \bigcup_{i=1}^{N} A_i \right|$$

Here, the term $A_i$ represents the $i^{th}$ segment of the three or more segments. When there are just two segments, however, the computation selection module 306 bases the technique selection on more than merely the number of segments. In particular, the computation selection module 306 also considers the determined number of users in each of the identified segments. If the number of users in one segment is substantially different from the number of users in the other segment, the computation selection module 306 is configured to again select the combined technique—employing the first overlap computation module 308 to compute the overlap.

The characteristics determination module 304 may also determine whether the number of users in two segments is substantially different. The characteristics determination module 304 may do so, in part, by computing a ratio of the smaller segment's number of users to the larger segment's number of users. The computation selection module 306 may then be configured to compare the ratio to an efficiency tolerance threshold as part of determining which overlap technique to select. In one or more implementations, the computation selection module 306 may make this comparison in accordance with the following:

$$\frac{|A_2|}{|A_1|} > \alpha$$

Here, $A_1$ represents the larger of the two segments (has a greater number of users) and $A_2$ represents the smaller of the two segments. The term $\alpha$ represents the efficiency tolerance threshold. If the ratio is less than the threshold, then the number of users may be considered substantially different, and the computation selection module 306 selects the combined technique.

If the ratio is greater than the threshold, however, then the characteristics determination module 304 can compute the union of the two segments, $|A_1 \cup A_2|$, using HLL. Based on this, the computation selection module 306 may select the second overlap computation technique and thus employ the second overlap computation module 310 to compute the intersection of the two segments, $|A_1 \cap A_2|$, using the Inclusion-Exclusion technique as discussed above. In other words, the second overlap computation module 310 computes the number of users that, individually, are part of both segments. The second overlap computation module 310 may provide this number of users to the characteristics determination module 304.

Given the number of users that are part of both segments (the intersection) as well as the number of different users in the two segments (the union), the characteristics determination module 304 can compute the Jaccard similarity of the two segments in the manner described above. The computation selection module 306 then compares the computed Jaccard similarity to the efficiency tolerance threshold. Based on this comparison, the computation selection module 306 can select to use the number of users that, individually, are part of both segments—as computed by the second overlap computation module 310—or employ the first overlap computation module 308 to compute the overlap. In particular, if the Jaccard similarity computed by the characteristics determination module 304 is greater than the efficiency tolerance threshold, then the computation selection module 306 uses for the number of overlapping users the number of users that, individually, are part of both segments—as computed by the second overlap computation module 310. However, if the computed Jaccard similarity is less than the efficiency tolerance threshold, then the computation selection module employs the first overlap computation module 308 to compute the number of overlapping users using the combined technique.

In one or more implementations, the computation selection module 306 uses the value of 0.5 for the efficiency tolerance threshold a. Nonetheless, other values may be used for the efficiency tolerance threshold without departing from the spirit or scope of the techniques described herein. The efficiency tolerance threshold can be user selected, for example, based on a preference for balancing speed and accuracy of the described techniques. In particular, the efficiency tolerance threshold may be set such that lesser values indicate a preference for faster computation (e.g., causing the second overlap computation module 310 to be used in more situations than larger values) and larger values indicate a preference for more accurate computation (e.g., causing the first overlap computation module 308 to be used in more situations than lesser values).

Regardless of the technique used, the user data overlap module 126 determines a number of overlapping users between the identified user segments 302. The user data overlap module 126 is configured to generate overlap value 312, which is data indicative of the determined overlap and which may be maintained in storage. The overlap value 312 may be associated with other metadata, such as timestamps associated with the determination, identifiers of the users in the segments, identifiers of the identified user segments, and so on. Additionally, the user data overlap module 126 may generate multiple overlap values 312 for a single determination of overlap. This is indicated by the ellipses next to the depicted overlap value 312. These multiple overlap values 312 may indicate, for instance, the number of overlapping users, a percentage of overlap, common attributes of the overlapping users, and so forth.

Using the overlap values 312, the user data overlap module 126 may be configured to generate digital content configured as an overlap report 314. The overlap report 314 may include one or more of the overlap values 312 and be configured for presentation to a user, such as to a user of the client device 104 via the segment interface application 116. The overlap report 314 may be configured to present the overlap values 312 to a user in a variety of different ways (e.g., via display, output audibly, and so forth) without departing from the spirit or scope of the techniques described herein. In this context, consider the example overlap report of FIG. 4.

Figure 4:
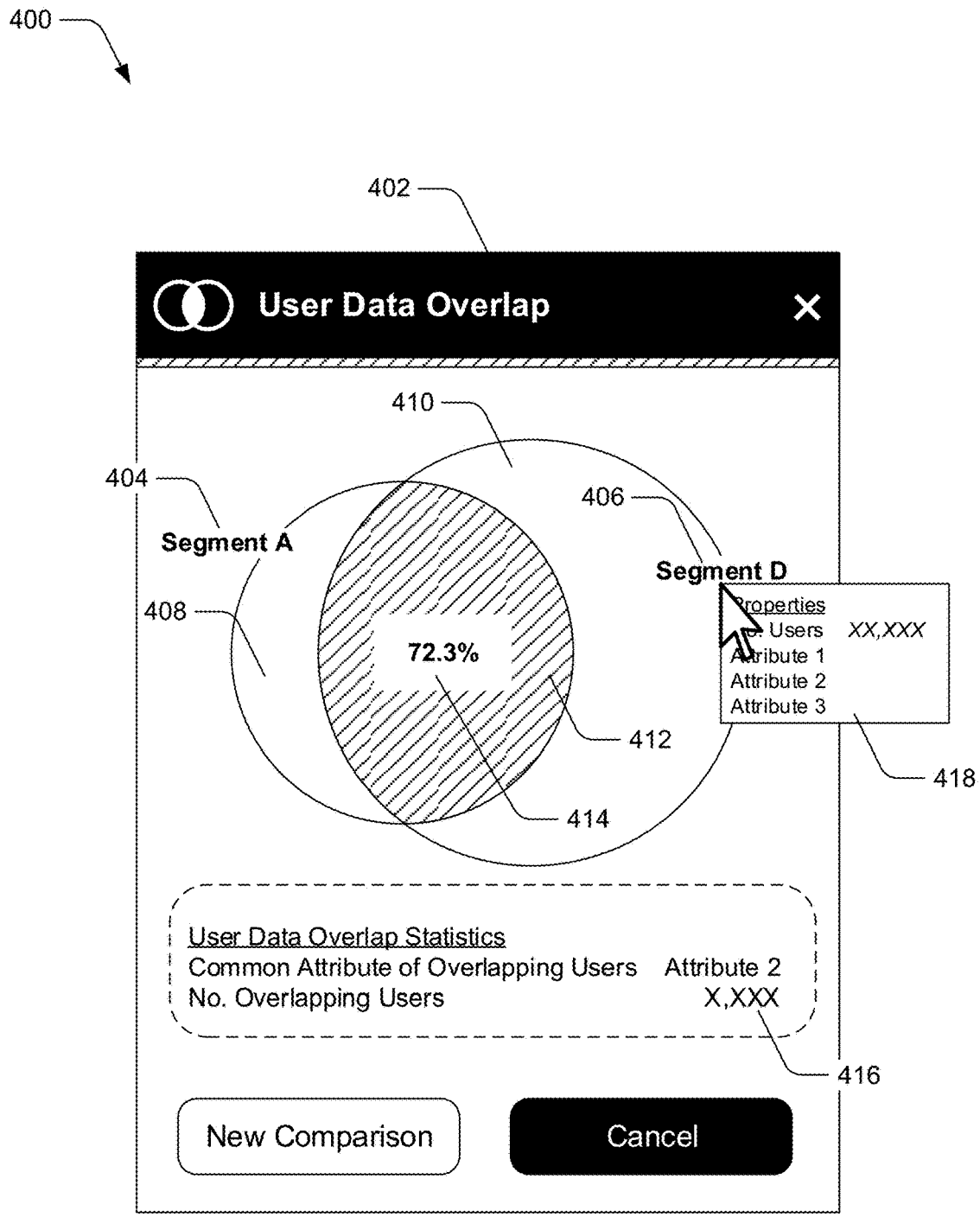
FIG. 4 depicts an example user interface configured to present overlap between the user data of multiple identified user segments.

FIG. 4 depicts an example user interface 400 that is configured to present an indication of overlap determined for the user data of multiple identified user segments. The illustrated example 400 includes overlap reporting interface 402, which is depicted as a displayable dialog box though other configurations are contemplated within the spirit or scope of the techniques described herein.

In accordance with the described techniques, the overlap reporting interface 402 may be generated as the overlap report 314 for presenting the overlap values 312. The overlap reporting interface 402 may be generated responsive to the user data overlap module 126 computing the overlap between the identified user segments 302. Furthermore, the overlap reporting interface 402 may be presented to a user of the client device 104 via the segment interface application 116.

In the depicted example, the overlap reporting interface 402 includes segment labels 404, 406, which indicate names of the segments for which overlap is computed. The segments may be named in a variety of different ways without departing from the spirit or scope of the techniques described herein. The illustrated example also includes segment indications 408, 410, which indicate relative sizes of the segments. In addition, the illustrated example includes segment overlap 412, which visually indicates an approximate degree to which the indicated segments overlap. The overlap reporting interface 402 is also configured to display a variety of additional information, including overlap percentage 414 and user data overlap statistics 416. The overlap reporting interface 402 is also depicted with a segment properties box 418, which may include properties of the segment relative to which the properties box 418 is displayed. Such properties may include a number of users in the particular segment, attributes of the users in the segment (e.g., demographic data), and so forth. Further, the properties box 418 may be displayed responsive to a user hovering a cursor over the segment label 406 as illustrated. The properties box 418 may be displayable responsive to a variety of other user actions, including selecting the segment label 406, selecting or hovering over the segment indication 410, tapping with a finger or stylus the segment label 406, tapping with a finger or stylus segment indication 410, and so forth.

Although the overlap reporting interface 402 is shown with a variety of information, the overlap reporting interface 402 may be configured to present different combinations of information that relates to segment overlap without departing from the spirit or scope of the techniques described herein. As noted above, this information may be presented in a variety of different ways, such as visually via a display device, audibly via speakers associated with a computing device, and so forth.

Having discussed example details of the techniques for user data overlap determination in a digital medium environment, consider now some example procedures to illustrate additional aspects of the techniques.

Example Procedures

This section describes example procedures for user data overlap determination in a digital medium environment in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service provider system 102 of FIG. 1 that makes use of a segment manager module 118 or the client device 104 that makes use of the segment interface application 116.

Figure 5B:
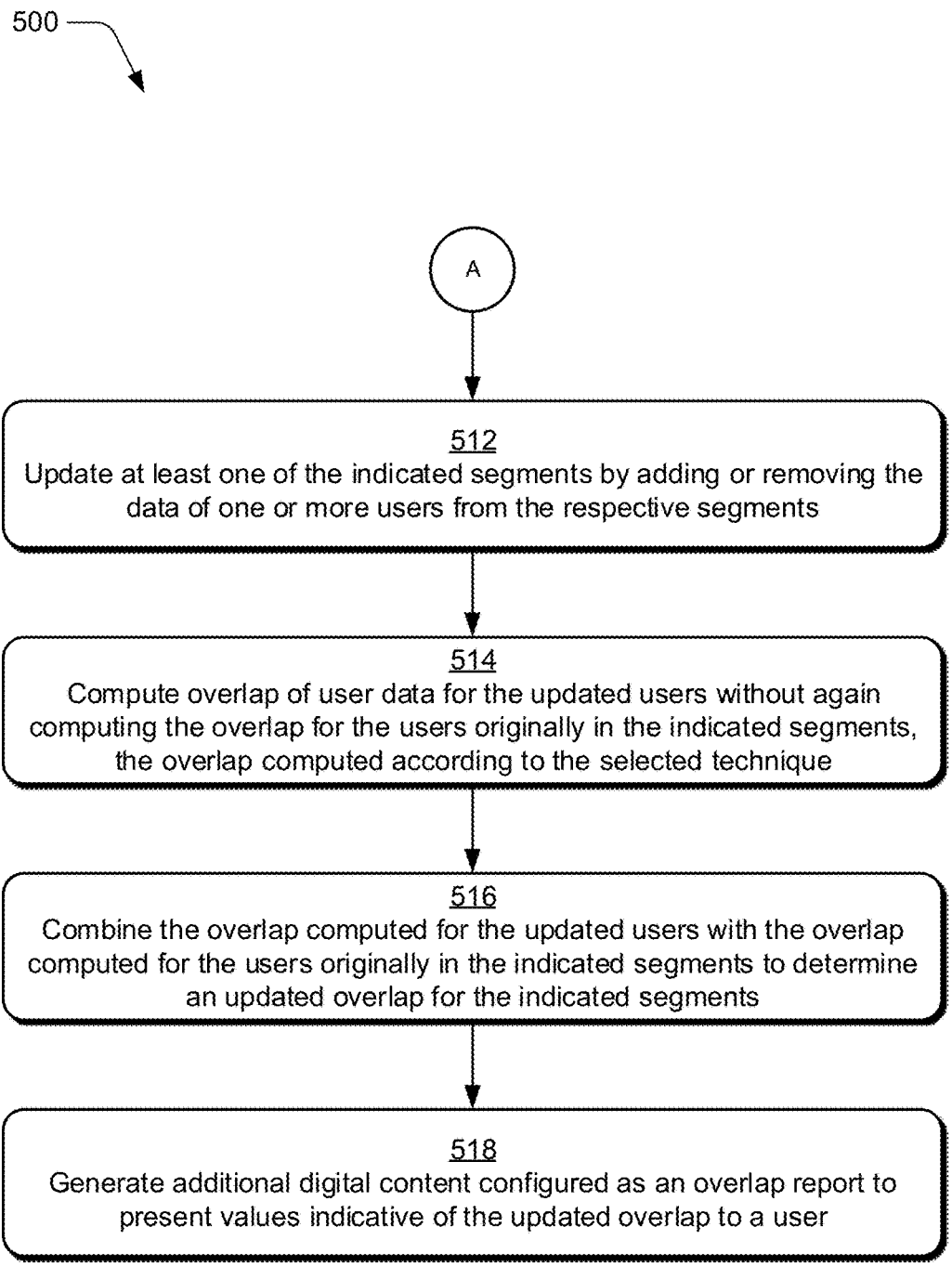

FIGS. 5A and 5B depict an example procedure 500 in which overlap is determined for the user data of multiple segments by selecting between two different techniques for computing user data overlap. Indications of segments of user data are obtained (block 502). In accordance with the principles described herein, the indications indicate segments for which a determination is to be made as to whether the segments include data for the same ("overlapping") users, and regarding an amount of overlap. By way of example, the user data overlap module 126 receives the identified user segments 302. The user data overlap module 126 of the segment manager module 118 may receive the identified user segments 302 from the client device 104 over the network 112.

Characteristics of the indicated segments are determined (block 504). In accordance with the principles discussed herein, these characteristics are determined by extracting information from the indication of identified user segments and based on an analysis of the user data associated with the indicated segments. By way of example, the characteristics determination module 304 determines a number of segments for which the overlap is to be computed by extracting information indicative of the number of segments from the identified user segments 302. The characteristics determination module 304 also analyzes the segment user data 122 associated with the identified user segments 302 to determine other characteristics of the indicated segments, such as a number of users in each of the segments and a measure of similarity (e.g., Jaccard similarity) between the segments.

An overlap determining technique is selected from multiple overlap determining techniques based on the determined characteristics (block 506). In accordance with the principles described herein, the overlap determining technique is determined for computing the overlap between the indicated segments, and can further be determined based on an efficiency tolerance threshold. By way of example, the computation selection module 306 selects between a robust-accuracy-but-slow technique (e.g., a combined MinHash and HLL technique) and a limited-accuracy-but-fast technique (e.g., an Inclusion-Exclusion technique) based on the characteristics determined by the characteristics determination module 304 at block 504. The computation selection module 306 also selects between these techniques based on an efficiency tolerance threshold that is adjustable to balance speed and accuracy of overlap determinations, as described in detail above.

User data overlap is computed between the indicated segments according to the selected technique (block 508). By way of example, the computation selection module 306 selects the combined MinHash and HLL technique for computing the overlap. The first overlap computation module 308 is thus employed to compute the overlap between the indicated segments according to the combined technique. Alternately, the computation selection module 306 selects the Inclusion-Exclusion technique for computing the overlap. The second overlap computation module 310 is thus employed to compute the overlap between the indicated segments according to Inclusion-Exclusion.

Digital content configured as an overlap report is generated to present to a user values indicative of the computed overlap (block 510). By way of example, the user data overlap module 126 generates the overlap report 314 to include overlap values 312 to indicate the overlap computed at block 508. The overlap report 314 can be communicated to the client device 104 for presentation via the segment interface application 116, e.g. for display as the overlap reporting interface 402. The procedure 500 continues at 'A' from FIG. 5A to FIG. 5B.

An indicated segment is updated by adding or removing the data of one or more users from the respective segments (block 512). By way of example, the segment generation module 120 updates at least one of the identified user segments 302, e.g., segment user data 122 representative of users is added to one of the identified user segments 302, segment user data 122 representative of users is removed from one of the identified user segments 302, and so forth. User data overlap is computed for the updated users of the indicated segments without again computing the overlap for the users originally in the indicated segments (block 514). In accordance with the principles discussed herein, the overlap is computed according to the selected technique. By way of example, the first overlap computation module 308 computes the overlap using the combined MinHash and HLL technique or the second overlap computation module 310 computes the overlap using the Inclusion-exclusion technique according to the selection made at block 506. The overlap is computed for the users updated at block 512 without computing the overlap again for the users that were part of the identified user segments 302 when the overlap was previously computed at block 508.

The overlap computed for the updated users is combined with the overlap computed for the users originally in the indicated segments to determine an updated overlap for the indicated segments (block 516). By way of example, the user data overlap module 126 combines the overlap computed at block 508 with the overlap computed at block 514 to determine an updated overlap for the identified user segments 302. Additional digital content configured as an overlap report is generated to present to a user values indicative of the updated overlap (block 518). By way of example, the user data overlap module 126 generates another overlap report to include values indicative of the updated overlap computed at block 516. This new overlap report can also be communicated to the client device 104 for presentation via the segment interface application 116.

Figure 6:
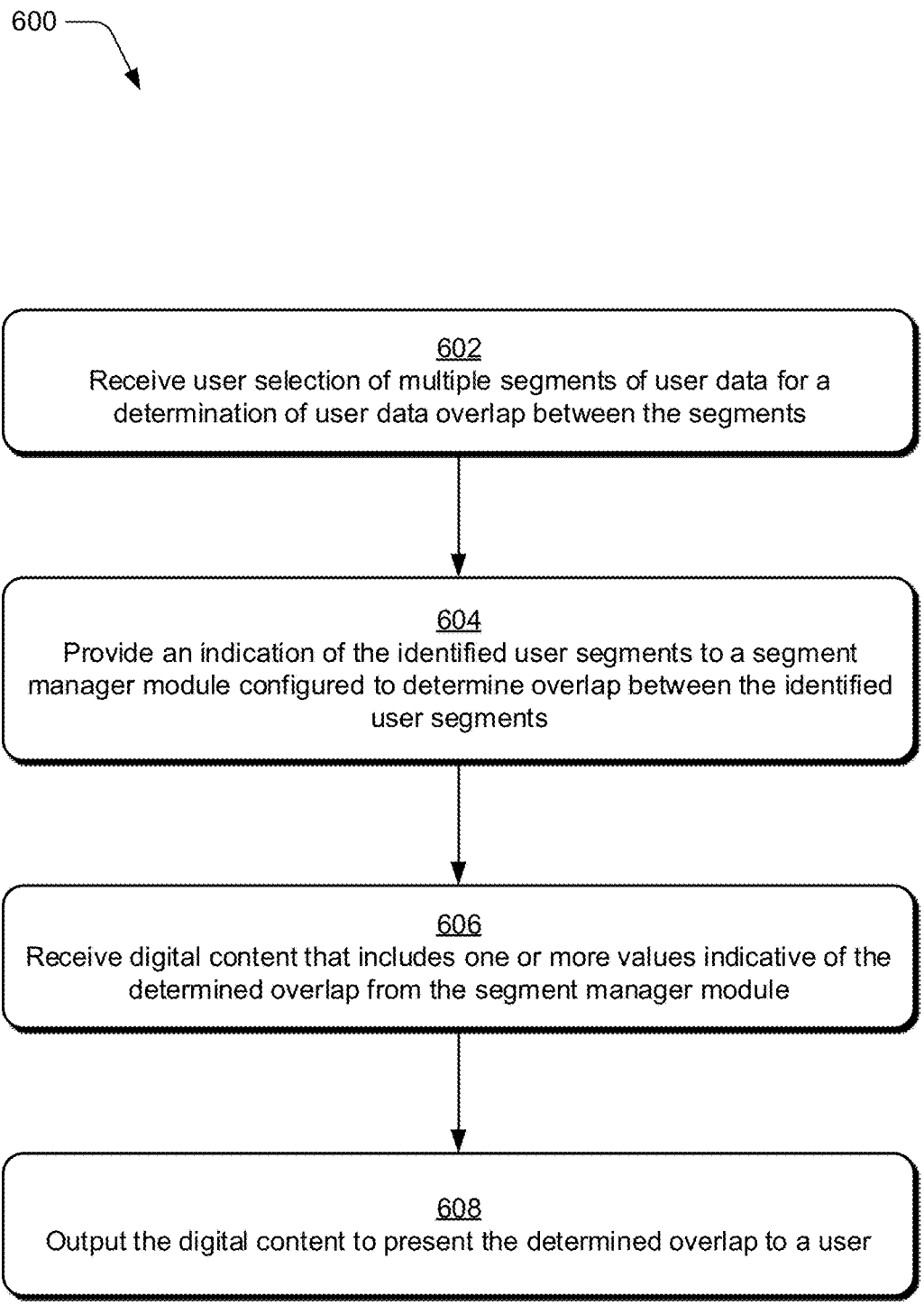
FIG. 6 depicts a procedure in an example implementation in which a user selection of segments is received for an overlap determination and in which the determined overlap is presented to a user.

FIG. 6 depicts an example procedure 600 in which a user selection of segments is received for determining overlap and in which the determined overlap is presented to a user. A user selection of multiple segments of user data is received for a determination of user data overlap between the segments (block 602). By way of example, the user selects multiple segments for which overlap is to be determined using the segment-selection interface 202, e.g., the user selects at least two segments using the first and second segment selection components 204, 206.

An indication of the identified user segments is provided to a segment manager module that is configured to determine overlap between the identified user segments (block 604). By way of example, the client device 104 generates and communicates the identified user segments 302 to the segment manager module 118 in accordance with the selections made at block 602.

Digital content that includes one or more values indicative of the determined overlap is received from the segment manager module (block 606). By way of example, the client device 104 receives the overlap report 314 from the marketing segment system 106 via a communication over the network 112. Alternately, the marketing segment system 106 is implemented locally at the client device 104. In this scenario, the marketing segment 106 may simply provide the overlap report 314 to an application of the client device 104, such as the segment interface application 116.

The digital content is output to present the determined overlap to a user (block 608). By way of example, the client device 104 outputs the overlap report 314 configured as the overlap reporting interface 402 via the segment interface application 116. In this scenario, the overlap report 314 is displayed. However, the overlap report 314 may be output in other ways such as audibly.

Having described example procedures in accordance with one or more implementations, consider now an example system and device that can be utilized to implement the various techniques described herein.

Example System and Device

Figure 7:
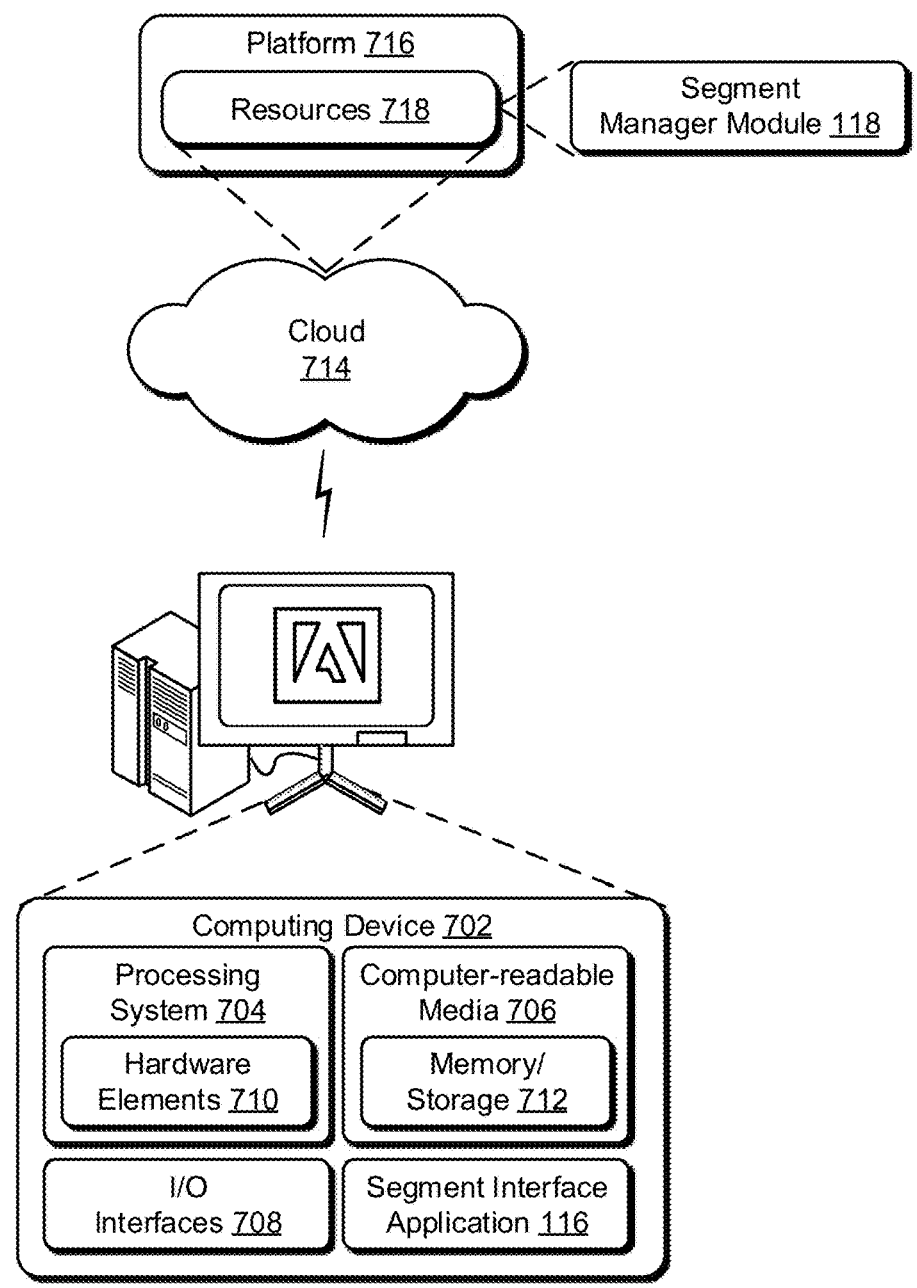
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the segment manager module 118 and the segment interface application 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   receiving, by a computing device and over a network, user input indicating multiple segments of user data for which a determination of user data overlap is to be made;
   determining, by the computing device, characteristics of the multiple segments by processing the user input and the user data of the multiple segments, the characteristics including a number of segments and a number of users represented by each of the multiple segments;
   selecting, by the computing device, a first overlap determining technique comprising a combined MinHash and HyperLogLog technique responsive to determining:
      the number of segments is greater than or equal to a threshold number of segments; or
      the number of segments is less than the threshold number of segments, and at least one of:
         a ratio of the number of users in a smaller segment of the segments to the number of users in a larger segment of the segments is less than a threshold, or
         a measure of similarity between the smaller segment and the larger segment is less than the threshold;
   selecting, by the computing device, a second overlap determining technique comprising an Inclusion-Exclusion technique responsive to determining:
      the number of segments is less than the threshold number of segments;
      the ratio of the number of users in the smaller segment of the segments to the number of users in the larger segment of the segments is greater than the threshold; and
      the measure of similarity between the smaller segment and the larger segment is greater than the threshold; and
   determining, by the computing device and for presentation to a user, an amount of overlap in the user data of the multiple segments by processing the user data of the multiple segments using the first selected overlap determining technique.

2. A computer-implemented method as described in claim 1, wherein the measure of similarity computed between the smaller segment and the larger segment comprises Jaccard similarity.

3. A computer-implemented method as described in claim 1, wherein the amount of overlap in the user data is indicative of an intersection of the multiple segments.

4. A computer-implemented method as described in claim 1, wherein the amount of overlap represents a number of overlapping users in the multiple segments.

5. A computer-implemented method as described in claim 1, further comprising:
   updating at least one segment of the multiple segments, the updating including at least one of adding the user data of new users to the at least one segment or removing the user data of users from the at least one segment;
   determining an amount of overlap in the user data of added and removed users using the selected overlap determining technique and without using the user data of the users relative to which the amount of overlap was previously determined;
   combining the amount of overlap for the user data of the added and removed users with a previously determined amount of overlap to determine an updated amount of overlap for the multiple segments; and
   generating digital content that includes a value indicative of the updated amount of overlap for presentation to a user.

6. A computer-implemented method as described in claim 1, further comprising generating, by the computing device, digital content that includes a value indicative of the amount of overlap for presentation to a user, the digital content configured for output via at least one of a display device or speakers associated with the computing device.

7. A computer-implemented method as described in claim 1, wherein the user input indicating the multiple segments of user data comprises a selection of one or more attributes to define each segment of the multiple segments of user data, each segment including the user data corresponding to the selected one or more attributes.

8. A computer-implemented method as described in claim 1, the Inclusion-Exclusion technique accurately determining overlap faster than the combined MinHash and HyperLogLog technique.

9. A system comprising:
a characteristics determination module implemented at least partially in hardware of at least one computing device to determine characteristics of multiple segments of user data data, the characteristics including a number of segments indicated by a request to determine an amount of overlap between the multiple segments and a number of users represented by each of the multiple segments;
a computation selection module implemented at least partially in the hardware of the at least one computing device to:
select a first overlap determining technique comprising a combined MinHash and HyperLogLog technique based on:
a determination that the number of segments is greater than or equal to a threshold number of segments; or
a determination that the number of segments is less than the threshold number of segments, and at least one of a ratio of the number of users in a smaller segment of the segments to the number of users in a larger segment of the segments is less than a threshold, or a measure of similarity between the smaller segment and the larger segment is less than the threshold; and
select a second overlap determining technique comprising an Inclusion-Exclusion technique based on:
a determination that the number of segments is less than the threshold number of segments;
a determination that the ratio of the number of users in the smaller segment of the segments to the number of users in the larger segment of the segments is greater than the threshold; and
a determination that the measure of similarity between the smaller segment and the larger segment is greater than the threshold; and
at least one overlap computation module implemented at least partially in the hardware of the at least one computing device to determine the amount of overlap between the multiple segments by processing the user data of the multiple segments using the selected overlap determining technique.

10. A system as described in claim 9, wherein the measure of similarity between the smaller segment and the larger segment comprises Jaccard similarity.

11. A system as described in claim 9, further comprising a segment manager module to enable users to select the segments to receive targeted digital content.

12. A system as described in claim 9, wherein the at least one overlap computation module is configured to output an overlap reporting interface for display at a client device, the overlap reporting interface including multiple segment indications representing each of the multiple segments and relative sizes for each of the multiple segments.

13. A system as described in claim 12, wherein the overlap reporting interface includes at least one of an indication of a percentage of overlapping users in the multiple segments or a number of overlapping users in the multiple segments.

14. A system as described in claim 12, wherein the overlap reporting interface includes an indication of a common attribute of overlapping users in the multiple segments.

15. A system as described in claim 12, wherein the overlap reporting interface includes a segment properties box that is displayed responsive to a user interaction with a segment indication of a particular segment, the segment properties box including at least one of a number of users in the particular segment or one or more attributes of users in the particular segment.

16. A system as described in claim 9, wherein the characteristics determination module is configured to receive user input indicating the multiple segments, the user input comprising a selection of one or more attributes to define each segment of the multiple segments, each segment including the user data corresponding to the selected one or more attributes.

17. A system as described in claim 9, wherein:
the characteristics determination module is configured to receive an update to at least one segment of the multiple segments, the update including at least one of the user data of new users being added to the at least one segment or the user data of users being removed from the at least one segment; and
the at least one overlap computation module is configured to:
determine an amount of overlap in the user data of added and removed users using the selected overlap determining technique and without using the user data of the users relative to which the amount of overlap was previously determined;
combine the amount of overlap for the user data of the added and removed users with a previously determined amount of overlap to determine an updated amount of overlap for the multiple segments; and
output a value indicative of the updated amount of overlap for presentation to a user.

18. A computer-implemented method comprising:
receiving, via a segment-selection interface of a client device, a user input selecting multiple segments of user data for a determination of user data overlap;
providing, by the client device, an indication of the selected segments to a segment manager of a computing device configured to determine the user data overlap between the selected segments by:
selecting, by the segment manager of the computing device, a first overlap determining technique comprising a combined MinHash and HyperLogLog (HLL) technique based on:
a determination that a number of the selected segments is greater than or equal to a threshold number of segments; or
a determination that the number of the selected segments is less than the threshold number of segments, and at least one of a ratio of the number of users in a smaller segment of the selected segments to the number of users in a larger segment of the selected segments is less than a threshold, or a measure of similarity between the smaller segment and the larger segment is less than the threshold; and
selecting, by the segment manager of the computing device, a second overlap determining technique comprising an Inclusion-Exclusion technique based on:
a determination that the number of the selected segments is less than the threshold number of segments;

a determination that the ratio of the number of users in the smaller segment to the number of users in the larger segment is greater than the threshold; and a determination that the measure of similarity between the smaller segment and the larger segment is greater than the threshold; and processing, by the segment manager of the computing device, the user data of the selected segments using the selected overlap determining technique; and presenting, via an overlap reporting interface of the client device, a value indicative of the user data overlap for the selected segments.

19. A computer-implemented method as described in claim 18, wherein the value indicative of the user data overlap for the selected segments comprises at least one of a number or a percentage of overlapping users.

20. A computer-implemented method as described in claim 18, wherein the measure of similarity comprises Jaccard similarity.

\* \* \* \* \*

UNITED STATES PATENT AND TRADEMARK OFFICE
CERTIFICATE OF CORRECTION

| | |
|---|---|
| PATENT NO. | : 11,651,382 B2 |
| APPLICATION NO. | : 15/610033 |
| DATED | : May 16, 2023 |
| INVENTOR(S) | : Kourosh Modarresi et al. |

It is certified that error appears in the above-identified patent and that said Letters Patent is hereby corrected as shown below:

In the Claims

Column 22, Line 24, after "using the", delete "first".

Column 23, Line 9, after "user data", delete "data".

Signed and Sealed this
Eighteenth Day of July, 2023

Katherine Kelly Vidal
*Director of the United States Patent and Trademark Office*